Figure 1:
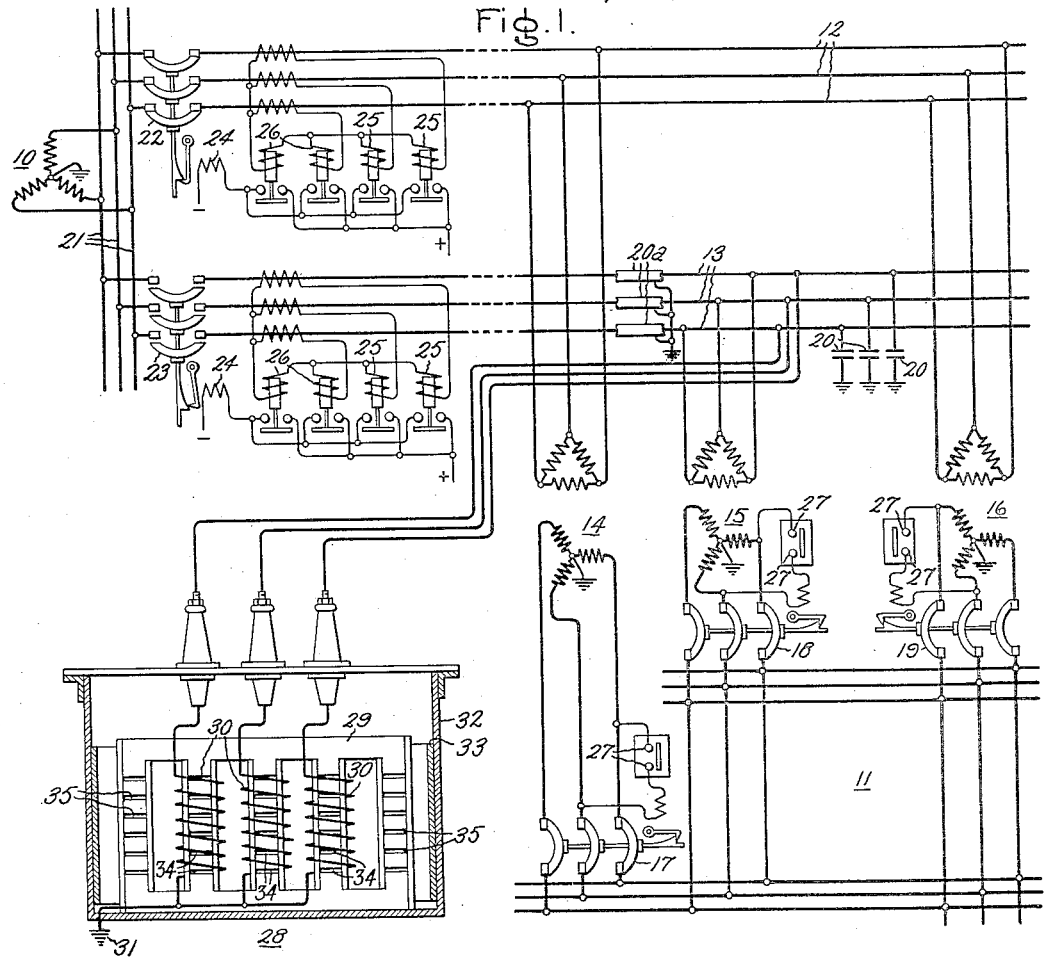

March 17, 1936.   F. H. KIERSTEAD   2,034,518

PROTECTION OF ELECTRIC SYSTEMS

Filed March 29, 1933

Inventor:
Friend H. Kierstead,
by Charles E. Mullen
His Attorney.

Patented Mar. 17, 1936

2,034,518

UNITED STATES PATENT OFFICE 2,034,518

PROTECTION OF ELECTRIC SYSTEMS

Friend H. Kierstead, Pittsfield, Mass., assignor to General Electric Company, a corporation of New York Application March 29, 1933, Serial No. 663,365

4 Claims. (Cl. 172—237)

My invention relates to improvements in the protection of electric systems and more particularly alternating current electric systems wherein a load circuit may be supplied from a grounded neutral source or sources over a plurality of feeders at least one of which is of relatively high voltage and high capacitance and is normally isolated from ground when disconnected from the source. The present invention is disclosed but not claimed in the copending application of Charles A. Woodrow, Serial No. 632,579, filed September 10, 1932.

In recent years, there has been developed a system of alternating current distribution commonly known as the low-voltage network system. In this system, which is particularly applicable to metropolitan districts involving concentrated loads, a source is connected to the network through high-voltage feeders and step-down transformers which in a three-phase system are delta-connected to the feeders. At the source station, there is a grounded neutral and and protective means including a circuit breaker for disconnecting a feeder from the source on the occurrence of a fault on the feeder. Consequently when a feeder is disconnected from the source, it is isolated from ground except in case of a ground fault. Inasmuch as the system is peculiarly adapted for use in congested areas, it is practically necessary to place the feeders, transformers and network protective equipment underground. Vaults are used for the transformers and the network protectors, each of which includes a circuit breaker and a directional tripping relay operative on back-feed, that is, on power flow from the network to the feeder, to open the circuit breaker. The feeders are underground cables and often so long as to have a relatively high capacitance. In some cases, a polyphase cable is used, one example of such cable being disclosed in United States Letters Patent 1,199,789. This cable which is sometimes called the Hochstadter cable is electrically the equivalent of three single-cored cables since each phase conductor has its own ground shield.

These network systems are usually so operated that as the load decreases one or more feeders are disconnected by the operator at the source station. The network protective tripping relay then operates on the reverse magnetizing current or back-feed to disconnect the network from the disconnected feeder or feeders and thereby reduce losses. Inasmuch as there are usually more than one connection from a feeder to the network and the connections are at different points, it is quite unlikely that all network protectors on a single feeder will operate simultaneously. Thus it is possible for a balanced back-feed to the feeder to exist for an appreciable time. This is particularly so if a network protector should fail to function as intended, since it then becomes necessary for someone to go to the vault where the protector is located in order to open the circuit breaker on the low voltage side of the transformer. Consequently, because of the high capacitance of the feeder, there may be a very large balanced capacitance current load of comparatively short or long duration. Such a current working through the inductance of the transformer and the network tends to produce over-voltages dangerous to lamps and other loads especially in that portion of the network adjacent the last protector to operate as well as to the feeder itself. Obviously the higher the operating voltage and the greater the length of the feeder, the higher and therefore more dangerous are these over-voltages.

In case of a ground fault on the feeder, the protective means at the source station operate to disconnect the feeder from the source. Since the feeder is then isolated from ground except at the ground fault, no ground fault current except that due to the unbalanced capacitance to ground of the ungrounded feeder conductors can flow. The voltage to ground of the ungrounded feeder conductors therefore immediately tends to rise to at least delta voltage above ground. Consequently there may be a large unbalanced capacitance current back-feed from the network to the feeder which lasts as long as the circuit breaker of a single network protector remains closed. Again dangerous over-voltages occur and may exist for some time if a network protector fails to function as intended and requires an operator's presence to open its circuit breaker. Because of this time, which has been arbitrarily adopted by some systems as one hour, the problem of limiting the fault current and voltages becomes more difficult by reason of the limitations on heat dissipation from apparatus in vaults.

Under either balanced or unbalanced back-feed, the capacitive current greatly alters the power factor of the circuit. Since the directional tripping relays which control the network circuit breakers operate in dependence on the current and both the magnitude and sign of the power factor and are expected to function on a small magnetizing current back-feed as well as a large fault current back-feed, it will be apparent that there is a very wide range both in current and power factor over which they must operate, particularly if large capacitance currents are involved. Obviously this complicates the problem of satisfactory protective relaying.

One object of the present invention is to provide simple and improved means for preventing the dangerous voltages which tend to occur by reason of the high capacitance of the feeder or feeders under both balanced and unbalanced back-feed. Another object of the invention is to provide such improved means for improving the power factor of the circuit as an aid to better relaying.

Figure 2:
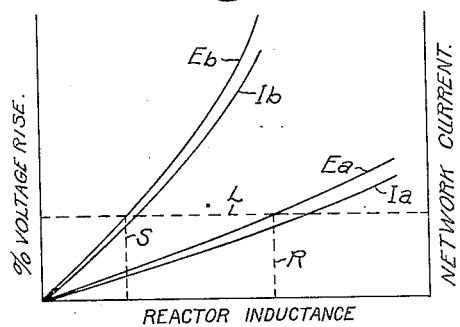

Other objects and advantages will be better understood from the following description taken in connection with the accompanying drawing in which Fig. 1 illustrates diagrammatically an embodiment of the invention as applied in connection with a low voltage network system and Fig. 2 is a curve diagram explanatory of the invention.

The invention is shown in Fig. 1 of the drawing, for purposes of illustration, as applied in connection with a three-phase low-voltage alternating current network system although it will be clear that the application of the invention is not so limited. As shown in the drawing the system includes a source 10 which is connected to a load circuit such as the network 11 through a plurality of relatively high voltage feeders 12 and 13, step-down transformers 14, 15 and 16 and network circuit breakers 17, 18 and 19. At least one of the feeders 13, which may be in the form of cable conductors having grounded shields as indicated at 20a, has a high capacitance schematically represented by the condensers 20. The source 10 has a grounded neutral as shown. The transformers 14, 15 and 16 are delta-connected to the feeders. Each feeder may have one or more connections to the network. At the source station, indicated by the bus 21, the feeders are provided with circuit breakers 22 and 23 having trip coils 24 under the control of suitable protective relay means which are responsive to faults on the feeders and which are illustrated as phase and ground fault over-current relays 25 and 26 respectively. The circuit breakers 22 and 23 may also be manually controlled to disconnect a feeder whenever desired as is well known in the art. The directional network tripping relays for controlling the circuit breakers 17, 18 and 19 are only schematically indicated by their contacts 27 and the necessary legends since their application is well known to the art. For the purpose of more clearly explaining the invention, the feeder circuit breaker 23 is shown open and it is assumed that only one network circuit breaker 18 is closed on this feeder.

In accordance with the invention an improved inductive means 28 connected between the feeder 13 and ground is provided which has an inductance so proportioned as to prevent abnormal voltage rises on the occurrence of a ground fault on the feeder and also due to the capacitive current taken by the feeder when disconnected from the source 10 and supplied from the feeder 12 through the network 11. This inductive means 28 is an improved form of reactor including a five-legged magnetic core 29 with windings 30 on its three inner legs. The windings 30 are connected between the three phase conductors of the feeder 13 and ground 31. The core 29 and its windings 30 are enclosed in a grounded steel casing 32 and a conductive shield 33 is provided between the core and casing, one of the purposes of the shield being to prevent magnetic flux from the reactor from entering and overheating the casing 32.

Under normal balanced operating conditions, the flux in each of the inner winding legs of the core is balanced by the combined fluxes in the other two winding legs so that all the flux circulates in the three winding legs and their connecting core yokes and there is no flux in either of the outer unwound legs. The inner winding legs of the core 29 are formed with non-magnetic gaps 34 so proportioned as to give the reactor a desired value of reactance under the normal balanced operating conditions. If this value of reactance is such that the lagging current flowing from the source 10 through the reactor completely compensates the charging current flowing from the source due to the inherent capacity 20 of the feeder 13, then the reactor will be excessively large and expensive, its losses will be high and the power factor of the circuit will be seriously lowered. Such complete compensation is not necessary however because the network voltages may be permitted to rise to a limited extent and for a limited period of time without causing lamp burnouts, insulation failures or other serious trouble. It has been determined in practice that no serious trouble will be caused by a rise of voltage of not more than about 20% above normal for a period of time of not over about one hour. Under given normal balanced conditions, the rise in voltage $Ea$ between the phase conductors of the feeder 13 and the increase in charging current $Ia$ fed from each phase conductor of the network 11 to the disconnected feeder 13 as determined by the impedance of the reactor may be represented by the curves $Ea$ and $Ia$ respectively of Fig. 2. By suitably proportioning the inductance of the reactor 28, the normal charging current $Ia$ of the feeder may be limited to such value, such as is indicated by the broken line R of Fig. 2, as will, under balanced back-feed conditions, limit the rise in feeder voltage and the increase of current supplied to the feeder by the network 11 to the desired maximum value as indicated by the broken line L of Fig. 2. The actual values will be determined by the permissible voltage rise, such as 20% above normal, in the portion of the network close to the network protectors and by the magnitude of the reverse charging current allowable for reasonable relay design.

In case one of the phase conductors of the feeder 13 becomes accidentally grounded, the corresponding winding 30 of the reactor 28 will be short circuited since the neutral of the reactor is grounded. When this happens, the normal line to neutral voltage of the other two windings 30 will be increased to line to line voltage which is 73% higher. The winding leg of the core which is surrounded by the short circuited winding 30 will carry no flux because no flux can flow through a short circuited winding. The vector sum of the fluxes in the other two winding legs is not balanced but is increased to 300% of the value of the flux in each winding leg under balanced conditions. If this very large amount of magnetic flux had no definite magnetic return path, it would be forced to return in the space between the windings 30 and the reactor casing. In order to force this flux through such a high reluctance return path, the lagging current drawn from the source 10 would be considerably greater than that necessary to compensate for the charging current of the feeder 13. This would result in a drop in voltage of the feeder and, from the standpoint of limitation of voltage rise, the reactor would function satisfactorily. However under these conditions the electrical and magnetic losses in the windings 30, in the casing 32, in the usual supports for the reactor core, and in other parts of the reactor would be so high that it would be necessary to disconnect the feeder from the network almost immediately. This may be impossible because if a protector fails to operate as intended it may be necessary that it be operated manually. The protector may be some distance from the station and before it could be reached and operated manually the time would be sufficient for the reactor to become very much overheated. It is usually the custom therefore to require that the reactor be capable of withstanding the results of a ground on one phase conductor of the feeder 13 for at least some definite arbitrary period of time, usually one hour. To meet this requirement, the reactor core 29 is formed with the two outer unwound legs which provide return paths for the flux so that overheating of the casing 32 and other parts of the reactor is avoided. If the reluctance of the two outer unwound legs of the transformer is too low, the inductance of the reactor under ground fault conditions will be too high and the ground fault will cause an excessive rise in voltage in the feeder 13 and in the network 11. The reluctance of the outer unwound legs of the core 29 is so proportioned that the inductance of the reactor, under ground fault conditions, will draw a suitable value of lagging current from the source 10 to compensate the charging current just sufficiently to limit the voltage rise in the feeder and network to the desired maximum value such as 20% above normal. It is desirable therefore that this inductance of the reactor be of such value as to limit the charging current Ib under ground fault conditions to the value represented by the broken line S in Fig. 2 so that the rise in the voltages under Ea and Eb under balanced and ground fault conditions respectively will be the same. If the desired reluctance of the outer unwound legs of the core 29 is obtained by a restriction of the cross-section of the legs and thus by magnetic saturation, there is apt to be trouble due to harmonics and it is therefore preferable to form each of these outer unwound legs with one or more, preferably a plurality, of non-magnetic gaps 35 so proportioned as to give the desired reluctance.

It is important from the standpoint of proper protective relay operation that the power factor of the back-feed current be high so that it is desirable that the circuit draw considerable energy from the source 10 and the more the uncompensated charging current, the greater is the amount of energy required. In accordance with the invention the amount of energy drawn from the source by the reactor under ground fault conditions is determined by the conductive shield 33 which surrounds the reactor core and windings between them and their casing 32. Due to the air gaps 35 and the reluctance of the outer unwound legs of the reactor core 29, some of the flux from the reactor under ground fault conditions enters the shield 33 and causes a current to circulate in it which is limited by the inherent reactance of the shield. The amount of energy drawn from the source 10 by the reactor is determined by making the resistance of the shield of such value that the I²R losses in the shield together with the other energy losses in the reactor equal the desired value. This means that the shield 33 should have substantial resistance so that it will absorb enough energy to reduce substantially the phase angle between the currents in the reactor windings and the corresponding voltages impressed across them so that the effect of the reactor with its shield is to reduce substantially the phase angle between the currents in the reactor windings and the currents in the conductors of the circuit 13 sufficiently to permit satisfactory protective relay operation. The shield also prevents flux from the reactor under ground fault conditions from reaching the casing 32 and causing excessive losses and overheating in it.

The invention provides an improved arrangement whereby the lagging Kv—a taken from a feeder under normal balanced conditions is determined by the characteristics of the three inner legs of the core with their non-magnetic gaps and their windings, the lagging Kv—a taken under ground fault conditions is determined by the outer unwound core legs having suitable reluctance, and the amount of energy drawn from the feeder under ground fault conditions to give proper relay operation is determined by the shield having suitable resistance and surrounding the reactor core and windings.

The invention has been explained by describing and illustrating a particular form and application thereof, but it will be apparent that changes may be made without departing from the spirit of the invention and the scope of the appended claims.

What I claim as new and desire to secure by Letters Patent of the United States is:

1. The combination of an alternating current load circuit, a source of alternating current, a feeder having capacitance, means for connecting said feeder to said source and to said load circuit, other means for feeding said load circuit, and an inductive device including a magnetic core with winding legs surrounded by windings connected between said feeder and ground, the reluctance of said winding legs being proportioned to limit to a predetermined value the rise in voltage due to the balanced capacitive current taken by the feeder when disconnected from the source and supplied from said other feeding means through the load circuit, said core also including means providing at least one magnetic return path for the flux in said winding legs during ground fault conditions on said feeder, the reluctance of said flux return means being proportioned to limit to a predetermined value the rise in voltage due to said ground fault conditions on the feeder.

2. The combination of an alternating current load circuit, a source of alternating current, a feeder having capacitance, means for connecting said feeder to said source and to said load circuit, other means for feeding said load circuit, an inductive device including a magnetic core with winding legs surrounded by windings connected between said feeder and ground, the reluctance of said winding legs being proportioned to limit to a predetermined value the rise in voltage due to the balanced capacitive current taken by the feeder when disconnected from the source and supplied from said other feeding means through the load circuit, said core also including means providing at least one magnetic return path for the flux in said winding legs during ground fault conditions on said feeder, the reluctance of said flux return means being proportioned to limit to a predetermined value the rise in voltage due to said ground fault conditions on the feeder, and a conductive shield for said core, the resistance of said shield being proportioned to draw a predetermined amount of energy from said source during ground fault conditions on said feeder.

3. An inductive device including a magnetic core having winding legs, windings on said winding legs provided with terminals, an external circuit connected to said terminals, said core also including at least one leg providing a return path for flux in said winding legs when one of said windings is short circuited, all of said core legs being formed with non-magnetic gaps to limit current in said windings both under balanced conditions and with one winding short circuited, and a shield adjacent said core and having resistance proportioned to absorb a substantial amount of energy to reduce the phase angle between the currents in said windings and the currents in the conductors of said circuit when one of said windings is short circuited.

4. An inductive device including a magnetic core having winding legs, windings on said winding legs, said core also including at least one leg providing a return path for flux in said winding legs when one of said windings is short-circuited, all of said core legs being formed with non-magnetic gaps to limit current in said windings both under balanced conditions and with one winding short-circuited, and a shield adjacent said core and having resistance proportioned to absorb a substantial amount of energy to reduce substantially the phase angle between the currents in said windings and the corresponding voltages impressed across them when one of said windings is short-circuited.

FRIEND H. KIERSTEAD.